Nov. 22, 1927.
A. C. DAMAN
1,650,434
CONTINUOUS FILTER
Filed July 11, 1925
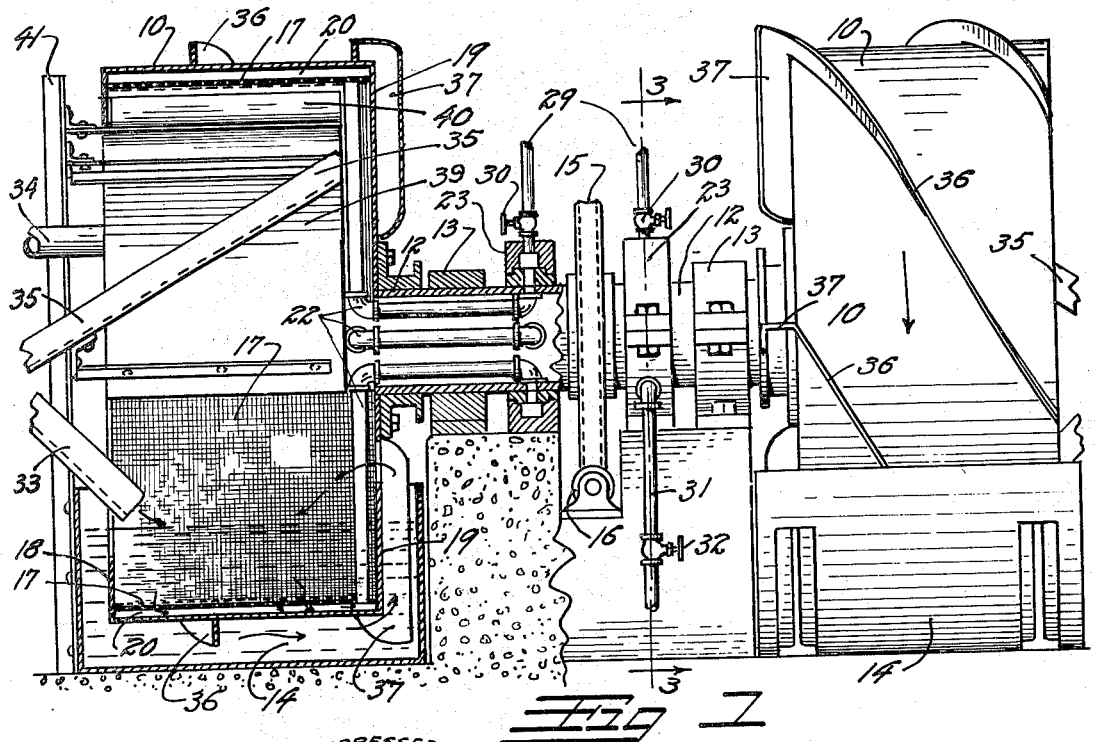
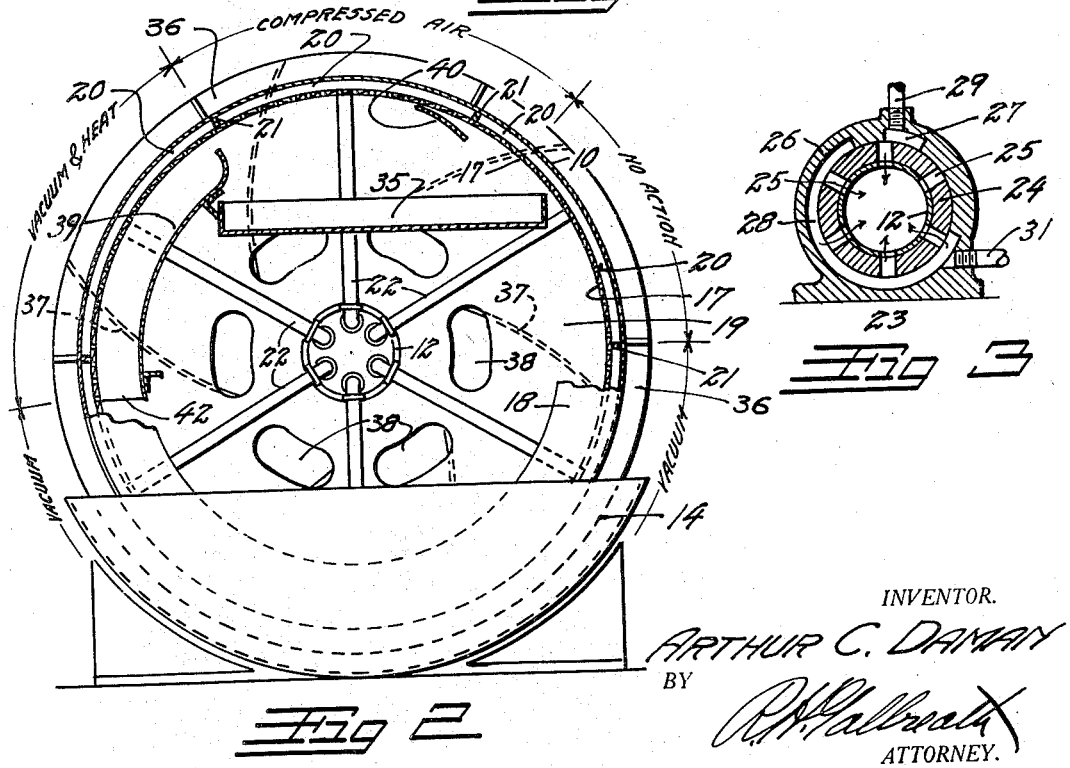
INVENTOR.
ARTHUR C. DAMAN
BY
ATTORNEY.

Patented Nov. 22, 1927.

1,650,434

UNITED STATES PATENT OFFICE.

ARTHUR C. DAMAN, OF DENVER, COLORADO.

CONTINUOUS FILTER.

Application filed July 11, 1925. Serial No. 42,946.

This invention relates to filters more particularly of the type designed for the separation of the metal-bearing solution from the pulp or worthless gangue matter in the cyanide treatment of ores.

The principal object of the invention is to combine, in a continuous filter, gravity filtration with forced filtration.

Another object is to provide efficient means in a filter of this type for constantly bringing the solid matter into contact with the filter medium and preventing packing thereof in the filter feed reservoir.

Still another object of the invention is to construct a drum filter so that one side of the drum will be entirely open and free from spokes or the like so as to allow unobstructed entrance and discharge of the material.

A further object is to so construct the filter that the force of gravity will assist in the removal of the filter cake.

A still further object is to provide drying means by which the moisture of the slimes is replaced by heated air.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a one-half side elevation of, and one-half vertical section through, the machine.

Fig. 2 is an end elevation thereof, partly broken away to disclose the interior construction.

Fig. 3 is a detail cross section through the valve mechanism employed and is taken on the line 3—3, Fig. 1.

As illustrated, the apparatus comprises two open sided filter drums 10 carried on the extremities of a common hollow shaft 12 which rotates in bearings 13. It is desired to be understood however that the apparatus would operate equally well if only one drum was employed, overhanging the extremity of the shaft 12, as the two drums and their attached apparatus are similar.

The lower portion of each drum 10 is submerged in a separate filter tank 14, preferably having a bottom contoured concentric with the drum 10. The drums are rotated very slowly by means of a worm drive gear 15 operated from a worm 16.

Spaced from the inner face of the drum 10 is a cylindrical filter medium 17, which may be of a material suitable to the work to be done, for instance, a cylindrical perforated screen either uncovered or covered on its inner face with duck. At the open side of the drum the edge is turned inward, as shown at 18. The filter medium extends from the inward turned edge 18 to the back 19 of the drum.

The space between the drum 10 and the filter medium 17 is divided into a plurality of equal sized cells 20 by means of axially extending partitions 21.

Each cell 20 is communicated with by a separate solution pipe 22 which leads through the shaft 12 to a control valve 23. With two of the drums 10 it is preferred to use two of the valves 23, one for each drum. However, it is not impossible for the two drums to be operated from a common valve, if desired.

The control valve, which has been designated in its entirety by the numeral 23, comprises: a valve collar 24 provided with port openings 25, which extend through the walls of the shaft, and, in each of which, one of the pipes 22 terminates; and a valve housing 26 having a compression chamber 27 and a vacuum chamber 28, with which, the port openings 25 register at predetermined times. Compressed air or steam is fed to the compression chamber 27 by means of a pressure pipe 29, from any suitable source, controlled by means of a valve 30. A vacuum is obtained in the vacuum chamber 28 through a suction pipe 31 controlled by means of a valve 32.

In operation, the solution and pulp are fed into the interior of the drum 10 by means of a feed trough 33 and overflowed into the filter tank 14 approximately to the solution line indicated in Fig. 1. The drum is rotated at a revolution in from five to ten minutes. By referring to Fig. 3, it will be seen that the cells 20 are under suction as they pass into and through the solution. This will draw the solution through the filter medium causing the pulp to build up into a cake upon the filter medium.

It is desired to call attention to the fact, that at this point the formation of the cake is aided by gravity, since the weight of the pulp naturally causes it to settle through the solution and come to rest upon the filter medium. This action assists the filtration as opposed to devices in which the solution is raised by suction.

The solution flows from the machine through the suction pipe 31. As the filter medium rises from the tank 14, the pulp will be carried upward, attached thereto in the form of a cake by the action of the suction in the cells 20, and will pass a drying hood 39 to which warm air is supplied through a warm air feed pipe 34. Warm air will now be drawn through the cake to displace the solution which is being drawn into the cells 20. This warm air will quickly dry the remaining pulp.

As the cells leave the drying hood 39, the corresponding port openings, in the valve 23, will be closed to the vacuum chamber 28 and will be opened to the pressure chamber 27. This will allow compressed air to flow from the supply pipe 29 to these cells, the pressure of which, will force the pulp cake away from the filter medium allowing it to fall to a pulp discharge chute 35.

Pulp which settles to the bottom of the tank 14, will be scraped to one side of the drum 10 by a spiral scraper 36, which comprises a series of spiral blades entirely surrounding the exterior of the drum. From this point, the pulp is elevated by means of elevating scoops 37 on the drum head 19. As the scoops 37 rise, the pulp will flow back into the drum 10 through openings 38 formed therein. The spiral scraper 36, since it only carries the accumulated pulp, has a thickening action which greatly assists in building up a thick cake of pulp on the filter medium.

To assist in the removal of the pulp cake, a scraper 40 may be arranged on the inside, and near the top, of the drum 10. The scraper 40 will act to remove the cake which has been loosened by the compressed air, allowing it to fall to the discharging chute 35.

The feed trough 33, the discharging chute 35, the drying hood 39, and the scraper 40 may all be carried on a suitable supporting frame 41, adjacent the open side of the drum 10.

The bottom of the drying hood 39, is open as shown at 42 to allow any dislodged cake to pass therethrough.

Six of the cells 20 have been shown upon the drawing. It is desired to be understood, however, that the invention is not limited to any specific number of cells.

By hanging the drums upon the opposite extremities of a common shaft, we have a construction which allows one face of the drums to be entirely open and unobstructed so that the material may be readily fed into the drums and discharged therefrom, without the use of complicated trunnions.

The machine may be operated, if desired, without the tanks 14. If thus operated the machine will be filled so as to not allow the solution to overflow the outer edge 18.

While a specific form of the improvement has been described and illustrated herein, it is desired to be understood that the same may be varied, within the scope of the appended claims, without departing from the spirit of the invention.

Having thus described my invention, what I claim and desire secured by Letters Patent is:—

1. A device for the separation of solution from pulp comprising a drum having an internal, cylindrical, filtering surface and adapted to rotate partially submerged in a tank and elevating means for conveying pulp from said tank to the inside of said drum.

2. A device for the separation of solution from pulp comprising a drum having an internal, cylindrical, filtering surface and adapted to rotate partially submerged in a tank and means for conveying pulp from said tank to the inside of said drum, said means comprising scrapers carried by said drum and adapted to scrape said pulp to one extremity of said tank and radially placed lifting members carried by said drum and arranged to gather the pulp from the said tank extremity and deposit same within said drum.

3. In a filtering apparatus comprising a rotatable filter drum partially immersed in a solution; means for elevating and conveying a portion of said solution toward the axis of said drum comprising channels extending from the periphery of said drum toward its axis.

4. In a filtering device comprising a drum having an open face and an internal, cylindrical, filtering surface and adapted to rotate partially submerged in a tank; an inwardly projecting flange surrounding said open face; a head in the opposite face of said drum by means of which it is supported and lifting vanes carried by said head so as to elevate material from said tank and cause it to flow through openings in said head.

5. In a filtering device comprising a drum having an interior cylindrical filtering surface adapted to rotate partially submerged in a solution, means for dislodging a filter cake from said filter surface; and a heater placed adjacent said filtering surface on the interior of said drum between said solution and said dislodging means.

In testimony whereof, I affix my signature.

ARTHUR C. DAMAN.